United States Patent Office 3,415,886
Patented Dec. 10, 1968

3,415,886
HEAT TREATED BISMUTH MOLYBDATE ON SILICA CATALYSTS
William R. McClellan, Kennett Square, Pa., assignor to E. I. du Pont de Nemours and Company, Wilmington, Del., a corporation of Delaware
No Drawing. Continuation-in-part of application Ser. No. 614,419, Feb. 7, 1967. This application Jan. 31, 1968, Ser. No. 701,850
14 Claims. (Cl. 260—603)

ABSTRACT OF THE DISCLOSURE

A bismuth molybdate or bismuth phosphomolybdate-on-silica catalyst is made by mixing a silica sol with compounds to give an aqueous slurry which produces, after drying and calcining, bismuth oxide, molybdenum oxide and optionally, but preferably, phosphorus oxide, in the desired proportions. A preferred method of preparing the catalyst is to add, prior to drying, ammonium carbonate, or aqueous ammonia, to the slurry until the pH is in the range of 5–7.5. Subsequently, the catalyst is dried and calcined at 450° C. and then further heated to temperatures of 750 to 850° C. The resulting catalyst has the formula:

$$Bi_aP_bMo_{12}Si_cO_d$$

where $a$ is equal to or greater than 4, $b$ is 0 to 2, $c$ is 24 to 160, and $d$ is $1.5a+2.5b+36+2c$. The catalyst is further characterized in that the bismuth molybdates present are substantially amorphous as determined by X-ray diffractometer examination.

CROSS REFERENCE TO RELATED APPLICATIONS

This application is a continuation-in-part of my copending application Ser. No. 614,419, filed Feb. 7, 1967.

BACKGROUND OF THE INVENTION

The invention relates to catalysts and more particularly to heat-treated bismuth molybdate and phosphomolybdate-on-silica catalysts and methods for their preparation.

Bismuth molybdate and phosphomolybdate catalysts are known in the art. They have been used for the oxidation of hydrocarbons, oxidative dehydrogenation of olefins, and also for the oxidation of olefin-ammonia mixtures to unsaturated nitriles. In general, such catalytic oxidations have required added water to obtain good conversions and yields.

Bismuth molybdate and phosphomolybdate catalysts are often deposited on a support, such as silica, silicon carbide, alumina, etc. Bismuth molybdate or phosphomolybdate-on-silica catalysts of the art have been prepared by use of finely divided solid, amorphous silica or by use of silica sols. Thus, use of silica sols is described in preparing "Control A" catalysts of U.S. Patent 3,248,340 and the catalysts of Examples 1–8 of U.S. Patent 2,904,580. Copending patent application Ser. No. 614,485, filed Feb. 7, 1967 discloses a method of preparing improved bismuth molybdate and bismuth phosphomolybdate catalysts by adding ammonium carbonate, ammonium bicarbonate or ammonium hydroxide during their preparation.

Bismuth molybdate or phosphomolybdate catalysts, supported or unsupported, are generally calcined at temperatures of 400–500° C. It is taught in the art, for example see U.S. Patent 3,280,166 and British Patent 965,200, that such catalysts are deleteriously affected by calcining or heating at temperatures in excess of 560–570° C.

SUMMARY OF THE INVENTION

Catalytic compositions of improved selectivity and directivity, useful at temperatures of 150° C. and above, can be obtained by mixing bismuth and molybdenum compounds in the presence of an aqueous silica sol to give a slurry which produces, after drying and calcining at conventional temperature of 400–500° C., a product containing $Bi_2Mo_3O_{12}$ bismuth molybdate as the major crystalline product and the $Bi_2Mo_2O_9$ and $Bi_2MoO_6$ bismuth molybdates as minor crystalline components. During preparation of the catalysts, it is preferred to add, prior to drying, ammonium carbonate, ammonium bicarbonate, or aqueous ammonia to the slurry of reactants to adjust pH to 5–7.5.

This product is further heated at 750–850° C. until the bismuth molybdates present in the composition are converted to a substantially amorphous phase as determined by X-ray diffractometer examination. "Substantially amorphous" means that the X-ray lines of the crystalline bismuth molybdates produced when the product is calcined at 400–500° C. are substantially reduced in intensity (specifically the 3.18A. line of $Bi_2Mo_3O_{12}$ is reduced at least 50% in intensity), or remain only as broad diffuse bands or low intensity, and are replaced by an amorphous, glassy phase with a very broad band centered at a $d$ value of about 3.3A. and with a peak width at one-half maximum intensity of 4–10 2 theta. Intensity is defined as the number of X-ray quanta per second as detected by a scintillation counter. The heating is carried out over a period of 0.5–10 hours or longer, preferably for a period of 1–2 hours.

It is preferred, but optional, that the catalysts contain chemically combined phosphorus. Preferred catalytic compositions have the formula $Bi_aP_bMo_{12}Si_cO_d$ where $a \geqslant 4$, $b=0-2$, $c=24-160$, and $d=1.5a+2.5b+36+2c$.

Surprisingly, the 750–850° C. heat treatment creates such changes in the catalysts that they have improved directivity or selectivity for the vapor phase oxidation of (1) methanol to formaldehyde, (2) propylene to acrolein, (3) butenes to butadiene, (4) p-xylene to terephthalaldehyde, and (5) propylene (in the presence of ammonia) to acrylonitrile. Further, good conversions and yields are obtained with these catalysts in many catalytic oxidations without the need for added water. The nature of the changes brought about by this heat-treatment is not fully understood.

DETAILED DESCRIPTION

Bismuth molybdate or phosphomolybdate-on-silica compositions, prepared as described for "Control A" catalyst in U.S. Patent 3,248,340 and for catalyst of Examples 1–8 of U.S. Patent 2,904,580 can be used as intermediates in producing the catalysts of this invention. However, in addition to the essential, novel high temperature calcination step of the present invention, it would be preferred to add ammonium carbonate, ammonium bicarbonate, or ammonium hydroxide, as described in copending application Ser. No. 614,485, filed Feb. 7, 1967, after mixing the components of the catalyst and prior to drying.

As in conventional processes, aqueous mixtures or slurries of the oxides of bismuth, molybdenum, and optionally but preferably, phosphorus are suitable for use in the present invention. There is nothing critical about the source of the ingredients of the catalyst composition, and commercially available reactants can be employed. Oxides that serve as reactants are usually obtained in situ from acids or soluble salts of the elements. Generally, phosphoric acid, ammonium molybdate, and bismuth nitrate serve as convenient sources of phosphorus, molybdenum and bismuth, respectively.

Bismuth salts such as the formate and the acetate can be used. With bismuth salts, even the nitrates, it is usually necessary to add an acid to avoid hydrolysis and precipitation during the mixing step. Thus, when bismuth nitrate is used, it is generally combined with nitric acid and water to make a bismuth nitrate solution.

Molybdenum oxide is usually obtained from aqueous ammonium molybdate; however, alkali molybdates can be used. When alkali molybdates such as sodium or potassium molybdate are used, sodium or potassium ion, which is difficult to eliminate completely, must be accepable in the final catalyst. An atomic Na/Mo ratio of 1:4 must not be exceeded in order to maintain good directivity in the catalyst. After processing in the manner described in this invention, heat-treated compositions containing sodium or other alkali or alkaline earth metals in the acceptable metal/molybdenum ratio of 1:4 or less give X-ray evidence of the presence of the scheelite structure of crystalline $M^x{}_{1/x}BiMo_2O_8$, where $x=$valence of alkaline earth or alkali metal M. In view of the desirability of low sodium and potassium content in most catalysts, ammonium molybdate is a preferred source of the molybdenum component of the catalyst.

Though ortho-phosphoric acid is generally used, meta-phosphoric acid and pyro-phosphoric acid may be substituted therefor. When phosphorus is present in the catalyst, lines for the high temperature form of crystalline bismuth phosphate (H—$BiPO_4$) may be found in the heat-treated product.

Generally, the proportions of components of the catalyst are not critical as long as the bismuth to molybdenum ratio (Bi:Mo) is controlled so that it is above 1:3. The upper limit on the amount of bismuth is not critical; however, in the interest of economy and the lack of substantially improved catalytic effect when large amounts are used, generally an atomic ratio of bismuth to molybdenum (Bi:Mo) of about 3:1 is not exceeded.

The catalysts preferably contain phosphorus, present as oxide or in other chemically combined form. The phosphorus affects catalytic properties, i.e., it acts as a moderator (improves selectively), but it has no appreciable effect on the physical properties of the catalyst. Catalytic compositions may include from 0 up to about 5% by weight phosphorus present in chemically combined form. The preferred range is 0.3–0.8% by weight of phosphorus. The phosphorus is believed to exist in the catalysts as bismuth phosphate and/or as amorphous bismuth phosphomolybdate.

The catalyst of this invention involves use of silica as a support, and the silica must be added as colloidal silica, i.e., an aqueous silica sol (silica sols generally contain about 30–40% silica). The silica can be present in the final catalyst in any amount less than 90% and greater than 5%, but is is preferred that the catalyst contain about 25–75% by weight of silica. Certain commercial silica sols contain small amounts of sodium (e.g., one commercially available product of 30% $SiO_2$ content contains 0.3% $Na_2O$ as titratable alkali) but, as previously discussed, low levels of sodium appear to have no serious effect on the catalysts of this invention. When these commercial silica sols are used, the catalytic composition can have the following formula:

$$Bi_aP_bMo_{12}Si_cO_dNa_e$$

where $a$ is $\leq 4$, $b$ is 0 to 2, $c$ is 24 to 160, $d$ is $1.5a+2.5b+36+2c+0.5e$ and $e$ is 0 to 3.

Many catalytically inert materials such as Alundum, alumina, titania, and the like can be used as auxiliary support materials, though silica is an essential component of the catalysts of this invention.

As well as serving as a support, the silica seems to function as a necessary component in obtaining the improved catalytic results with the present catalysts. Surprisingly, the improved catalytic performance, the disappearance of crystalline bismuth molybdates, and the appearance of a new amorphous phase are obtained only on heating at 750–850° C. of compositions prepared via a silica sol route. Heating at 750–850° C. of pellets pressed from intimate mixtures of finely divided $Bi_2O_3$, $MoO_3$, and amorphous $SiO_2$ does not result in the effects enumerated above. It is highly probable that silica is actually bonded (e.g., as a silicate) into the Bi/Mo oxide structure during the high temperature treatment which results in the novel catalytically active product of the present invention.

In order to produce a catalyst of minimum sodium content and thus achieve superior stability in use as high temperature, it is preferred to use a silica sol of low sodium content. Such silica can be derived from the sols produced by the methods of Balthis U.S. Patents 2,614,-994 and 2,614,995, or from collodial silica produced by the high temperature oxidation of silicon halides.

In the preferred embodiment of the invention, the catalysts can have the following composition ranges:

| Elements: | Weight percent |
| --- | --- |
| Bismuth | 4.5–55 |
| Molybdenum | 2.5–32 |
| Silicon | 0.6–42 |
| Oxygen | 20–50 |
| Phosphorus | 0–5 |

In a preferred embodiment, as set forth in application Ser. No. 614,485, filed Feb. 7, 1967, to the slurry of oxides or the compounds which produce the desired oxides is then added ammonium carbonate, ammonium bicarbonate or ammonium hydroxide to obtain a pH within the range of 5–7.5. The ammonium carbonates or hydroxide can be added with mixing as aqueous solutions or as powders. During the addition or soon thereafter, at a pH of 5.5 or higher, gelation occurs fairly rapidly, the exact rate depending inter alia upon the purity and the particle size of the silica in the original sol.

After the addition of ammonium carbonate, bicarbonate or hydroxide, the resulting slurry or gel is dried and calcined. The composition to which the carbonates have been added will contain in excess of 0.1% chemically combined carbon dioxide. When this composition is subsequently heated to 250° C. and higher, most of the carbon dioxide will be expelled. However, the carbon dioxide which has at one time been present leaves a residual porosity which is thought to contribute to the greater activity and directivity of this preferred catalyst in some processes. The structure of the catalyst may also be similarly modified by the initial presence and then the decomposition of hydroxy groups when ammonium hydroxide is used rather than the carbonates.

The drying can be accomplished by conventional means such as air-drying, spray-drying, extrusion-drying, oil bath-drying, and the like.

After drying, the catalyst is calcined in a suitable furnace usually at a temperature between 750–850° C. The time the catalyst is heated is not critical; the time can range from 0.5–10 hours or more, and preferably is 1–2 hours. If desired, the catalyst can be calcined in two steps, the first being at the temperatures conventional in the art, 400–500° C., and the second at the higher temperature of 750–850° C. As set forth in more detail in Examples 1 and 2, this heat-treatment produces a new composition which, as explained herein, is largely amorphous when no alkali metal is present. After the heat treatment, the catalyst, if it is not in the desired physical form, can be crushed and screened. It is also possible to heat-treat in situ; thus, the dried catalyst may be placed in a reactor wherein a catalytic reaction is conducted at 750–850° C.

In a further aspect, the catalytic activity of the bismuth phosphomolybdate-on-silica and bismuth molybdate-on-silica catalysts can be enhanced or promoted by adding to the catalyst, usually in the form of their oxides, various metals hereinafter referred to as promoters. The amount of promoter added is not critical and the quantity can range from 0.1–10% by weight of the catalyst.

The following promoters can be present: manganese, boron, the alkaline earths, e.g., magnesium, calcium, strontium, and barium; the rare earths, the metals of Group VIII such as iron, cobalt, nickel, ruthenium, rhodium, palladium, osmium, iridium, and platinum; and the metals of Group V, vanadium, columbium, and tantalum.

These promoters are usually applied by impregnation or surface coating of already formed bismuth molybdate or phosphomolybdate-on-silica catalysts. Thus, the metals can be added to the slurried catalyst as a salt or acid or the metal, e.g., as a compound which is thermally decomposable in situ to form the desired promoter. After the catalyst has been impregnated with such solutions, employed in concentrations adequate to provide the desired amount of material, the impregnated catalyst may be dried and calcined at any desired temperature.

The catalysts of the invention are very useful in the vapor phase catalytic oxidation of olefins to their oxygenated derivatives, such as the conversion of olefins to aldehydes and ketones, e.g., propylene to acrolein. The catalysts are particularly useful for reactions which are conducted above 150° C.; however, once they have been prepared they can be used in reactions which are conducted at temperatures lower than 150° C. In the art process of oxidizing propylene to acrolein, water is added to enhance conversion and yield. With catalysts of the present invention, high yields and conversions are obtained in the absence of added water.

Further, the catalysts of the invention are useful in the catalytic oxidative dehydrogenation of olefins to diolefins such as butadiene and tertiary amylenes to isoprene. The catalysts are also useful in converting propylene, ammonia and oxygen to acrylonitrile.

The catalysts of the invention are particularly useful in the conversion of methanol to formaldehyde. The novel bismuth molybdate and phosphomolybdate-on-silica catalysts give exceptionally high conversion and selectivity in this oxidation. Further, the catalysts of the invention allow higher temperatures of operation than possible with the prior art catalyst.

The catalyst of the invention is particularly useful in a two-step process for the catalytic conversion of methanol to formaldehyde as set forth in Payne, U.S. Patent 2,519,788. In this art process a mixture of methanol, air and steam is introduced into a converter containing a silver gauze catalyst. In the initial feed, the air to methanol weight ratio ranges from 0.5:1 to 2:1. In this converter the methanol is partially (65 to 80%) oxidized and dehydrogenated to formaldehyde. This reaction takes place between 300° and 850° C.

The reaction products from the first converter, which include unreacted methanol, formaldehyde, water vapor and by-products, are cooled below 180° C. and introduced into a second converter. Prior to introduction, auxiliary air is added to the reaction products to provide additional oxygen. The second converter contains a metal oxide catalyst, e.g., molybdenum oxide, a metal phosphate catalyst promoted with molybdic oxide, or an iron molybdate catalyst. In this converter the unconverted methanol is oxidized to formaldehyde. This second converter operates at a temperature between 250° and 400° C., and the oxygen concentration is between 7 and 14 volume percent.

The just described process is considerably improved by using catalysts of the present invention in the second stage or converter in lieu of the art metal oxide catalyst.

Use of the catalyst of the present invention permits wider ranges of temperature, greater variation in methanol and oxygen concentration, and also permits the addition of methanol with the supplementary air. It is usually satisfactory to employ an amount of oxygen 15–150% greater than the theoretical amount needed to convert the methanol to water and formaldehyde. In the temperature range of 475–550° C. there is no critical upper limit on oxygen concentration, but in commercial operation it is advantageous to pump as little air as possible. In the temperature range of 550–675° C., an oxygen concentration greater than 50% excess should be avoided.

By allowing the second stage reaction to take place at temperatures of 475–675° C. instead of the temperature range used in the art, coupled with the use of an excess of oxygen, a more controllable reaction and greater selectivity are obtained.

The maximum amount of methanol that can be used without encountering runaway reaction in a process of the type described in U.S. Patent 2,519,788 is at least 10% greater when the present catalyst is employed in the second converter. This additional methanol can be added with the auxiliary air introduced into the product stream from the first converter.

The present catalyst has the additional valuable property of resistance to fusion and/or loss of catalytic activity under runaway reaction conditions. The infrequent, but almost certain runaway reaction encountered in the second stage converter with the commercial catalysts usually employed requires shutdown of the unit for laborious removal of fused catalyst. The present catalyst survives runaway reaction temperatures greater than 900° C. without loss of catalytic activity.

Accordingly, in the second stage, using the catalyst of the invention, the reaction may be run with a higher oxygen content and at a temperature from 475–675° C. with temperatures between 500° and 575° C. being preferred. Between 575 and 675° C. the operating conditions must be closely controlled. By close control is meant controlling the oxygen concentration to avoid in excess of 50% of the theoretical amount and also controlling the amount of catalyst contacted by the synthesis gases so that the contact time is less than 0.4 second. At lower temperatures, i.e., temperatures below 575° C. down to 500° or 475° C., this control is not critical.

The following examples are offered to further illustrate the catalysts of this invention.

Example 1

Phosphoric acid (74 parts of 85% $H_3PO_4$) is added to 8330 parts of an aqueous silica sol containing 30% silica (approximate colloidal particles size of 13–14 millimicrons and 0.3% of $Na_2O$ as titratable alkali). Bismuth nitrate pentahydrate (2800 parts) is dissolved in a solution of 160 parts of 70% nitric acid diluted to 1540 parts with distilled water. The bismuth nitrate solution is then added to the phosphoric acid-silica sol. A solution of 1360 parts of ammonium molybdate

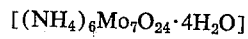

$$[(NH_4)_6Mo_7O_{24} \cdot 4H_2O]$$

dissolved in 1540 parts of distilled water is added to the solution containing the silica sol.

To this slurry is then added 920 parts of ammonium carbonate, resulting in a pH of 5.9 and fairly rapid gelation. The resulting gel is dried in an oven at 94° C. for 24 hours and calcined in a furnace at 450° C. for 24 hours.

After cooling, the product is crushed into particles, screened through an 8-mesh screen, and caught on a 14-mesh screen. X-ray diffraction shows the presence of the well-known crystalline $Bi_2O_3 \cdot 3MoO_3$ as the major phase and crystalline $Bi_2O_3 \cdot 2MoO_3$, $Bi_2O_3 \cdot MoO_3$, and H—$BiPO_4$ as minor phases. A portion of this product is heat-treated in a furnace at 800° C. for 2 hours. Another portion is heat-treated at 750° C. for 1 hour. An X-ray diffraction pattern of the latter product shows all the lines of the three forms of bismuth molybdate to be at about one-half their original intensity, persistent lines of H—$BiPO_4$, and a set of new, sharp lines with "$d$" values (as measured with a North American Philips wide range goniometer using $CuK_a$ radiation) as indicated in Table I below. This new pattern corresponds with the known scheelite structure of $NaBiMo_2O_8$.

The X-ray diffraction pattern of the product heated at 800° C. includes the same scheelite $NaBiMo_2O_8$ lines, present at about double the intensities found in the pattern from the product heated at 750° C. but only a vestige of the original lines due to bismuth molybdates. In another preparation, the product prepared at 800° C. showed, in addition to the above constituents, the presence of a small amount of α-cristobalite.

Table I.—New lines in X-ray pattern of heat-treated (750° C.) catalyst

| "d" values (A.): | Intensity (percent [1]) |
|---|---|
| 4.86 | 3 |
| 3.14 | 100 |
| 2.93 | 18 |
| 2.63 | 17 |
| 2.31 | 4 |
| 1.95 | 20 |
| 1.86 | 8 |
| 1.73 | 11 |
| 1.60 | 15 |
| 1.57 | 7 |
| 1.28 | 3 |
| 1.27 | 5 |

[1] Relative to the line at 3.14 A., taken as 100%.

The virtual disappearance of the crystalline bismuth molybdates and the appearance of a new amorphous phase as a result of heat treatment at 800° C. is quite contrary to expectation since increased temperature normally effects an increase in crystalline order. Indeed, an increase in crystalline order manifested by an increase in the sharpness and intensity of the bismuth molybdate lines is found on heating the 450° C. calcined product to 600–650° C.

The product heated at 800° C. is analyzed and the following data in percent by weight is obtained:

| | Percent |
|---|---|
| Silicon | 24.02 |
| Molybdenum | 15.25 |
| Bismuth | 23.78 |
| Phosphorus | 0.46 |
| Sodium | 0.4 |
| Oxygen (by difference) | 36.09 |

These data calculate (based on molybdenum) to the following atomic ratio relationship:

$$Bi_{8.7}P_{1.1}Mo_{12}Si_{65}O_{171}Na_{1.3}$$

The catalysts of this example are useful in the oxidation of propylene to acrolein and further in the oxidation of methanol to formaldehyde where they give exceptionally high conversion and selectivity in this operation.

Example 2

A catalyst is prepared as described in Example 1 except that the aqueous silica sol of this example contains 9.5% SiO₂ (approximately colloidal size of 6–8 millimicrons), is free of titratable Na₂O, and is used in the amount of 24,990 parts.

An X-ray diffraction pattern of the product after calcining at 450° C. for 20 hours shows the presence of crystalline Bi₂O₃·3MoO₃ as the major phase, crystalline H—BiPO₄ and minor amounts of the crystalline bismuth molybdates, Bi₂O₃·2MoO₃ and Bi₂O₃·MoO₃. After heating in a furnace for 2 hours at 800° C., the X-ray lines for H—BiPO₄ are essentially unchanged but the lines for the bismuth molybdate compositions practically disappear (persist only as weak and broad, diffuse bands) and a new amorphous or glassy phase appears with a very broad band at a "d" value of about 3.3A. This does not correspond to the band for amorphous silica which has a "d" value of about 4.1A. The new phase that develops on 800° C. treatment is the major phase present, and it has a peak width in the range of 7° to 8° 2 theta which is typical of many amorphous materials, including silicate glasses.

The product heated at 800° C. is analyzed and the following data in percent by weight is obtained:

| | Percent |
|---|---|
| Silicon | 23.42 |
| Molybdenum | 15.31 |
| Bismuth | 24.43 |
| Phosphorus | 0.55 |
| Oxygen (by difference) | 36.29 |

These data calculate (based on molybdenum) to the following atomic ratio relationship:

$$Bi_{8.8}P_{1.3}Mo_{12}Si_{63}O_{177}$$

This activity and selectivity of this catalyst in oxidation reactions is essentially the same as the activity and selectivity of the catalyst of Example 1.

Example 3

A modified bismuth phosphomolybdate catalyst is prepared in the following manner:

A solution containing 9.3 parts of 85% phosphoric acid, 272 parts of molybdic acid (85% MoO₃), 40 parts of nitric acid, and 582 parts of Bi(NO₃)₃·5H₂O in 400 parts of water is added to 750 parts of an aqueous solution of an aqueous colloidal silica sol containing 30% silica.

To this mixture is added 28–30% ammonium hydroxide solution until the pH of the mixture is in the range 5.5–7.

The mixture is then evaporated to dryness, calcined at 450° C., ground, and screened. The catalyst is then heat-treated as described in Example 1.

This catalyst is effective in various hydrocarbon oxidation reactions.

Example 4

A vertical quartz tube, ¾" in diameter, containing 9 cc. of the 800° C. heat-treated granular catalyst of Example 1, supported on a thin bed of quartz wool in the middle of the tube, is heated externally with a surrounding electrically heated furnace. A gas stream prepared by vaporizing 7 g./hr. (0.218 mole) of methanol into a gas stream heated to 100° C. and formed by mixing a stream of helium with a flow of 1030 cc./min. and of oxygen with a flow of 78 cc./min. is introduced into the furnace at a temperature, as recorded by a thermocouple touching the outside wall of the quartz tube at catalyst level, of 430° C. A thermocouple embedded in the catalyst bed records a temperature of 550° C. The effluent gas is passed into a flask cooled to 0° C. and the residual gas stream is scrubbed with methanol and then analyzed for CO and CO₂. Analysis of reaction products shows 100% conversion of methanol with 95% yield of formaldehyde. No measurable formic acid is obtained; the other products are oxides of carbon.

Under similar conditions except for the use of 12.8 g./hr. of methanol, an oxygen flow of 115 cc./min., a furnace temperature of 360° C., and a catalyst bed temperature of 550° C., an 88% conversion of methanol at 95% yield of formaldehyde is obtained.

With the product calcined at 450° C. as the catalyst, under conditions (described above) of low methanol "feed," a furnace temperature of 400° C. results in a reaction temperature of 525° C. and the production of about double the amounts above of CO₂ and CO. When reaction temperature is increased to 550° C. excessive amounts of CO and CO₂ are produced and great difficulty is encountered in preventing a runaway reaction unless the methanol concentration is markedly reduced.

With the product of Example 1 heat-treated at 750° C. as the catalyst, under the same conditions, the conversions are about the same as with the 800° C. treated catalyst, but the yields of formaldehyde are in the range of 87–92%.

Example 5

A side-stream reactor consisting of a stainless steel tube 1″ in diameter, which contains 12 cc. of the 800° C. heat-treated catalyst as described in Example 1, is connected into the line between the primary (silver gauze catalyst) and secondary (iron molybdate catalyst) converters in a commercial methanol oxidation process. First stage reaction product consisting of 8% $O_2$, 9% methanol, 17% formaldehyde, 9% hydrogen, 2% $CO+CO_2$, 10% water, and 45% nitrogen is passed at a temperature of 275–300° C. into the side-stream reactor tube at a rate of 1400 cc./min. The external heater at the catalyst bed position is controlled to give a reaction temperature of 525° C. Analysis of the reaction product shows essentially quantitative conversion of methanol at high yield to formaldehyde. Gas analysis also shows that the hydrogen is not oxidized under these conditions.

Further, in this reaction, even with the low oxygen content in the off gas, there is a higher hydrogen content than that which is obtained from the conventional silver gauge catalyst. This indicates dehydrogenation of methanol in the presence of excess oxygen with the catalyst of the invention.

Example 6

A catalyst was prepared according to the procedure of Example 1 except that the slurry was adjusted to pH of 6 by the addition of 170 ml. of 28–30% commercial ammonium hydroxide rather than with ammonium carbonate. The catalyst was dried, calcined, crushed, and screened, and heat-treated at 800° C. for 2 hours. This catalyst gave results similar to those described in Example 3 in the conversion of methanol to formaldehyde.

I claim:

1. In the process for preparing bismuth molybdate-on-silica catalysts by mixing an aqueous silica sol with a composition containing bismuth oxide and molybdenum oxide, and drying the resulting composition, the improvement comprising heating said composition to 750° C. to 850° C. until the bismuth molybdates present are substantially amorphous as determined by X-ray diffractometer examination.

2. The process of claim 1 wherein the bismuth oxide-molybdenum oxide composition also contains phosphorus oxide.

3. The process of claim 1 wherein ammonium carbonate, ammonium bicarbonate, or ammonium hydroxide is added to the aqueous composition, prior to the drying step, until the pH of the composition is in the range of 5 to 7.5.

4. The process of claim 2 wherein ammonium carbonate, ammonium bicarbonate, or ammonium hydroxide is added to the aqueous composition, prior to the drying step, until the pH of the composition is in the range of 5 to 7.5.

5. The process of claim 3 wherein the bismuth molybdate-on-silica catalyst is impregnated with a catalytic amount of a catalytic promoter metal selected from the group consisting of the alkaline earth metals, the rare earths, Group VIII metals, Group V metals, and manganese.

6. The process of claim 4 wherein the bismuth phosphomolybdate-on-silica catalyst is impregnated with a catalytic amount of a catalytic promoter metal selected from the group consisting of the alkaline earth metals, the rare earths, Group VIII metals, Group V metals, and manganese.

7. A bismuth molybdate-on-silica catalyst composition useful at temperatures above 150° C. consisting essentially of the formula $$Bi_aPb_bMo_{12}Si_cO_d$$

where $a\geqq4$, $b$ is 0 to 2, $c$ is 24 to 160, and $d$ is $1.5a+2.5b+36+2c$, the composition characterized in that the bismuth molybdates present are substantially amorphous as determined by X-ray diffractometer examination.

8. A bismuth molybdate-on-silica catalyst useful at temperatures above 150° C. having the formula $$Bi_aPb_bMo_{12}Si_cO_d$$

where $a\geqq4$, $b$ is 0 to 2, $c$ is 24 to 160, and $d$ is $1.5a+2.5b+36+2c$, said catalyst being formed by mixing an aqueous silica sol with a composition of compounds containing phosphorus oxide, bismuth oxide, and molybdenum oxide in said proportions, adding ammonium carbonate, ammonium bicarbonate, or ammonium hydroxide to the aqueous composition until the pH of the composition is in the range of 5 to 7.5, drying the composition and calcining at 750° to 850° C. until the bismuth molybdates present are substantially amorphous as determined by X-ray diffractometer examination.

9. The catalyst of claim 7 wherein the bismuth molybdate-on-silica catalyst is impregnated with a catalytic amount of a catalytic promoter metal selected from the group consisting of the alkaline earth metals, the rare earths, Group VIII metals, Group V metals, and manganese.

10. The catalyst of claim 8 wherein the bismuth molybdate-on-silica catalyst is impregnated with a catalytic amount of a catalytic promoter metal selected from the group consisting of the alkaline earth metals, the rare earths, Group VIII metals, Group V metals, and manganese.

11. In a two step process for the vapor phase conversion of methanol with oxygen to formaldehyde, where in the first step a portion of the methanol is converted over a silver catalyst, the improvement comprising converting the remainder of the methanol in the second step over a catalyst as defined in claim 7 at a temperature between 475° and 675° C.

12. The two step process of claim 11 wherein additional methanol is added to the reaction product of the first step prior to being fed into the second step.

13. A bismuth molybdate-on-silica catalyst composition useful at temperatures above 150° C. consisting essentially of the formula $$Bi_aPb_bMo_{12}Si_cO_dNa_e$$

where $a\geqq4$, $b$ is 0 to 2, $c$ is 24 to 160, $d$ is
$$1.5a+2.5b+36+2c+0.5e$$
and $e$ is 0 to 3, the composition characterized in that the bismuth molybdates present are substantially amorphous as determined by X-ray diffractometer examination.

14. A bismuth molybdate-on-silica catalyst useful at temperatures above 150° C. having the formula $$Bi_aPb_bMo_{12}Si_cO_d$$

where $a\geqq4$, $b$ is 0 to 2, $c$ is 24 to 160, and $d$ is $1.5a+2.5b+36+2c$, said catalyst being formed by mixing an aqueous silica sol with a composition of compounds containing phosphorus oxide, bismuth oxide, and molybdenum oxide, drying the composition and calcining at 750° to 850° C.

References Cited

UNITED STATES PATENTS

| | | | |
|---|---|---|---|
| 2,491,695 | 12/1949 | Stiles | 252—467 XR |
| 2,519,788 | 8/1950 | Payne. | |
| 3,186,955 | 6/1965 | Callahan et al. | 252—437 XR |
| 3,232,977 | 2/1966 | Konig et al. | 252—437 XR |

PATRICK P. GARVIN, *Primary Examiner.*

U.S. Cl. X.R.

252—437, 456, 455